United States Patent [19]

Dunn, Jr.

[11] Patent Number: 4,833,202

[45] Date of Patent: May 23, 1989

[54] MULTI-ETHYLENIC MONOMERS FROM GLYCOSIDES

[75] Inventor: Larson B. Dunn, Jr., Decatur, Ill.

[73] Assignee: A. E. Staley Manufacturing Company, Decatur, Ill.

[21] Appl. No.: 46,819

[22] Filed: May 5, 1987

[51] Int. Cl.$^4$ ............................................... C08F 8/00
[52] U.S. Cl. ................................ 525/54.2; 525/54.26; 526/238.23
[58] Field of Search ........................ 525/54.2, 54.26; 526/238.23

[56] References Cited

U.S. PATENT DOCUMENTS

| Re. 29,131 | 2/1977 | Smith | 260/77.5 |
| 3,935,330 | 1/1976 | Smith | 427/41 |
| 4,719,272 | 1/1988 | Tsai et al. | 526/238.2 |

OTHER PUBLICATIONS

Radiation Curing: Kirk-Othmer; Encyclopedia Chemical Technology, vol. 19, pp. 607–624.
Jedlinski, Bull. Acad. Pol. Science 9, 103–106 (1961).
Haworth, W. N.; J Chem. Soc., p. 488 et seq. (1946).
Nichols, J Am Chem Soc 66, 1625 (1944).
Treadway, R. H., "Methacrylate Esters of Glucose and Other Carbohydrates": JACS 66, pp. 1038 and 1039, 1945.
Mesentsev, A. S., "Methyl Sibivosaminide, a Novel Branched-Chain Aminohexopyranoside from the Antibiotic Sibiromycin"; Tetrahedron Letters, vol. 24, pp. 2225–2228 (1973).
B. Golding, *Polymers and Resins*, pp. 1–10 and Table of Contents (Van Nostrand Co. 1958).
R. G. Schweiger, "Synthetic Polysaccharides I. Methyl Mono- and Methyl Di-O-allyl-alpha-D-Glucosides and Their Polymerization", *Journal of Polymer Science*, Pf.A. vol. 2, pp. 2471–2480 (1964).
Chemical Abstracts 61:3194e, R. G. Schweiger, "Synthetic Polysaccharides", J. Polymer Sci., Pt. A 2(5) 2471–80 (1964).

*Primary Examiner*—C. Warren Ivy
*Assistant Examiner*—Alex H. Walker
*Attorney, Agent, or Firm*—Michael F. Campbell; J. Daniel Wood

[57] ABSTRACT

A polymerizable composition comprised of a major amount of a polymerizable component and a minor amount of a multi-ethylenic glycoside compound (e.g. acrylate and/or methacrylate esters of an alkyl glucoside or allyl ethers of an alkyl glucoside) useful in forming a crosslinked polymeric composition. Novel multi-ethylenic alkyl glucosides are disclosed which are prepared by a novel method. The polymerizable compositions are useful as castings, moldings, extrusions, coatings, binders and adhesives. The multi-ethylenic alkyl glucoside monomers yield crosslinked polymeric compositions having properties which are generally comparable, or superior, to compositions based on commercially available multi-ethylenic monomers.

18 Claims, No Drawings

MULTI-ETHYLENIC MONOMERS FROM GLYCOSIDES

FIELD OF THE INVENTION

This invention relates to multi-ethylenic monomers and to the use of multi-ethylenic monomers to form crosslinked polymeric compositions in a variety of shapes and forms, e.g., castings, moldings, extrusions, coatings, binders, and adhesives.

BACKGROUND OF THE INVENTION

The use of multi-ethylenic monomers as crosslinkers in free-radical addition polymerization systems is discussed in an article in Kirk-Othmer, *Encyclopedia of Chemical Technology*, Vol. 19, pps. 607–624 entitled "Radiation Curing" by V. McGinness. The use of multi-ethylenic monomers as crosslinkers in a variety of polymerization systems, e.g., polymerization with mono-functional acrylic monomers, and/or ethylenically unsaturated oligomers, and/or graft polymerization of polymers, is discussed and extensively referenced. Specific multi-ethylenic monomers disclosed in the article are 1,6-hexanediol diacrylate, tetraethylene glycol diacrylate, trimethylolpropane triacrylate, and pentaerythritol triacrylate. The above monomers are acrylates of straight chain or branced chain polyols and thus introduce crosslinks of a particular geometry. While more complex monomers are available, generally for use in low volume specialty applications, the above monomers are the most prevalently used multi-ethylenic crosslinking monomers, probably because of their synthesis from starting materials available on a high volume commerical scale. It would be desirable to provide multi-ethylenic monomers having a cyclic structure to introduce a different crosslink geometry, yet which can be easily produced on a high volume commercial scale from readily available starting materials based on renewable resources.

SUMMARY OF THE INVENTION

This invention relates to multi-ethylenic monomers derived from glycosides and to the use of glycoside-derived multi-ethylenic monomers to form crosslinked polymeric compositions. These compositions can take a variety of forms such as castings, moldings, extrusions, coatings, binders, and adhesives.

In one aspect, the invention relates to a polymerizable composition of matter useful in forming a crosslinked polymeric composition comprising:
(a) a major amount of a polymerizable component selected from the group consisting of mono-ethylenically unsaturated monomers, reactive oligomers, reactive polymers, and mixtures thereof; and
(b) a minor amount of a multi-ethylenic glycoside compound having a plurality of ethylenically unsaturated groups copolymerizable with said polymerizable component.

Preferred multi-ethylenic glycoside compounds are acrylic or methacrylic esters or allylic ethers of an alkyl glycoside having two or more of such ester or ether groups. Particularly preferred are alkyl glucosides having the structural formula:

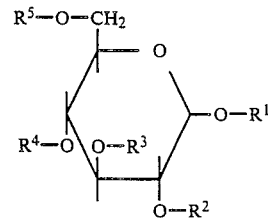

wherein $R^1$ is alkyl and $R^2$–$R^5$ are independently selected from hydrogen, alkyl, aralkyl, allyl, acrylyl, and methacrylyl, provided that: i) at least two of $R^2$–$R^5$ are allyl, acrylyl or methacrylyl groups, and ii) $R^4$ and $R^5$ may together comprise the residue of an aldehyde or ketone.

In another aspect, this invention relates to a crosslinked polymeric composition comprising the product of curing a composition comprised of a major amount of a polymerizable component as described above, and a minor amount of a multi-ethylenic glycoside compound having a plurality of ethylenically unsaturated groups copolymerizable with said polymerizable component.

In another aspect, this invention relates to a composition of matter comprising a multi-ethylenic alkyl glucoside compound having the structural formula recited above wherein $R^2$–$R^5$ are acryly groups, and to a method of making such a composition comprising reacting a reactant selected from the group consisting of an alkyl glucoside and acrylate derivatives thereof with a reactant selected from the group consisting of acrylic acid anhydride and acrylic acid halides in the presence of a catalytically effective amount of a tertiary amino-functional pyridine.

In another aspect, this invention relates to a composition of matter comprising a multi-ethylenic alkyl glucoside compound having the structural formula recited above wherein at least three of $R^2$–$R^5$ are methacrylyl and to a method of making such a composition.

In yet another aspect, this invention relates to a composition of matter comprising a multi-ethylenically unsaturated alkyl glucoside compound having the structural formula recited above wherein $R^4$ and $R^5$ are the residue of an aromatic aldehyde and $R^2$ and $R^3$ are both selected from the group consisting of acrylyl and methacrylyl, and to a method of making such a composition.

DETAILED DESCRIPTION OF THE INVENTION

The polymerizable components useful in this invention are any materials which are capable of addition copolymerization with the multi-ethylenic glycoside compounds useful in this invention to form a crosslinked polymeric composition. The polymerizable components include mono-ethylenically unsaturated monomers capable of homopolymerization, or copolymerization with other ethylenically unsaturated monomers, as well as copolymerization with the multi-ethylenic glycoside compound. Examples of suitable mono-ethylenically unsaturated compounds include alkyl acrylates, alkyl methacrylates, vinyl esters, vinyl amines and vinyl aromatic compounds. Specific examples include ethyl acrylate, t-butyl acrylate, 2-ethylhexyl acrylate, methyl methacrylate, lauryl methacrylate, vinyl acetate, N-vinyl pyrrolidinone, styrene, and vinyl toluene.

Examples of useful reactive oligomers include low molecular weight polymers (e.g., about 1,000 to 25,000 g/mole) having polymerizable ethylenic unsaturation. Specific examples include maleic-fumaric unsaturated polyesters, acrylate-terminated polyesters (e.g. those described in U.S. Pat. No. Re 29,131 to Smith et al.) acrylic copolymers having pendant vinyl unsaturation (e.g. allyl acrylate/acrylic copolymers), epoxy acrylates, and polyurethane acrylates.

Examples of useful reactive polymers include graft polymerizable polyolefins, e.g., polyethylene, polypropylene, and ethylene/propylene copolymers, and polymers having polymerizable ethylenic unsaturation along the backbone, for example diene homopolymers or copolymers (e.g., styrene-butadiene copolymers, cis-polybutadiene, and butadiene-acrylonitrile copolymers).

Multi-ethylenic glycosides are glycosides having a plurality of substituents which are ethylenically unsaturated. Glycosides are substituted saccharides in which a substituent group is normally attached, through an oxygen atom, to the aldehyde or ketone carbon of the saccharide. Accordingly, most glycosides are acetals or ketals. Alkyl glycosides, as used herein, refer to acetals or ketals of a saccharide with an alcohol. Preferred alkyl glycosides are lower alkyl glycosides wherein the alkyl group has from one to four carbon atoms. Typical saccharides from which the glycoside is derived include fructose, glucose, mannose, galactose, talose, gulose, allose, altrose, idose, arabinose, xylose, lyxose and ribose. The preferred glycosides are glucosides due to the ready availability of glucose as a starting material.

The polymerizable component and multi-ethylenic glycoside compound can be mixed in any convenient manner which will place the component and compound in a sufficiently reactive association to form a crosslinked polymeric composition on subsequent curing thereof. Such techniques include conventional wet chemistry techniques, e.g., dissolution in a common solvent system, and conventional rubber milling techniques, e.g., banding on a rubber mill.

The amount of the multi-ethylenic glycoside compound will vary depending upon the contemplated application of the cured polymeric composition, but will generally be sufficient to detectably crosslink the polymeric composition. The degree of crosslinking of the cured polymeric composition can be determined by conventional techniques, e.g., resistance to solvents (e.g., swelling, extractibles, and/or spot-testing). In preferred compositions, the amount of multi-ethylenic glycoside compound will be sufficient to measurably increase the gel content of the cured polymeric composition, e.g., preferably by at least about 1% and more preferably at least about 5%. Typical levels of multi-ethylenic glycoside will range from about 0.1 to about 10% by weight of the polymerizable components of the polymerizable composition.

The multi-ethylenic glycoside compounds useful in this invention are obtained by covalently bonding a plurality of the appropriate ethylenically unsaturated groups, as well as any desired optional groups, to a glycoside by the reaction of appropriate ethylenically unsaturated reactants, and desired optional reactants, with the free hydroxyl groups of a glycoside.

Alkyl glycosides are well known materials. Methyl glucoside is an item of commerce, available from A. E. Staley Mfg. Company as STA-MEG TM brand methyl glucoside. The preparation of higher alkyl glucosides from methyl glucoside is described by Gomberg, M. and Buchler, C. C., J. Am. Chem. Soc. 43, 1904 (1921) and Swiderski, J. and Temerinsz, A., Carbohydrate Res., 3 (2), 225-9 (1967). As used herein, the term "lower alkyl" shall mean alkyl groups having from about 1 to 4 carbon atoms, i.e. methyl, ethyl, n-propyl, isopropyl, n-butyl, sec-butyl, isobutyl, and tert-butyl.

The glycoside can generally be derivatized by conventional techniques to obtain the multi-ethylenic glycoside compounds useful in this invention, with the exception of the novel multi-ethylenic alkyl glucoside of compounds of this invention described above. Examples of such conventional techniques include acetal and ketal formation as described in D. M. Hall, Carbohydrate Research, 86, 158 (1980), and M. L. Wolfram, et al., Carbohydrate Research, 35, 87 (1974); acrylation techniques as described in Z. Jedlinski, Bull. Acad. Pol. Sci. 9 p. 103 et seq. (1961), Z. Jedlinski, Roczniki Chem., 30 (1956), 333, Z Jedlinkski, Roczniki Chem. 32, 1257, (1958) and W. N. Haworth, et al., J. Chem. Soc. p. 488 et seq. (1946); and alkylation techniques as described in J. Brimacombe, et al., Carbohydrate Research, 35, 87 (1974) and P. Nichols, et al., J. Am. Chem. Sec. 66, 1625 (1944).

In the acrylation of a glycoside, an anhydride or acid halide, e.g., chloride, of acrylic or methacrylic acid is reacted with a glycoside, or derivative thereof, in the presence of a tertiary amine catalyst, e.g. pyridine. The reaction can generally be accomplished in an inert solvent, but the catalyst or one of the reactants can also act as a solvent. In the alkylation of a glycoside, the glycoside is generally treated with a strong base to convert one are more of the hydroxyl groups to alkoxide groups which are reacted with an alkylating agent, e.g., an alkyl halide.

However, it was found that the conventional acrylation techniques described above could not be used without modification to produce the novel multi-ethylenic alkyl glucoside compounds of this invention, i.e., tetra-acrylyl alkyl glucosides, tri- or tetra-methacrylyl alkyl glucosides and di-(meth)acrylyl esters of an aromatic ketal of alkyl glucosides. To prepare these derivatives using (meth)acrylic anhydrides or halides, it is necessary, contrary to the teaching of Haworth et al, above, to use a tertiary amino-functional pyridine as a catalyst e.g., dimethylaminopyridine or pyrolidinopyridine, to obtain the novel multi-ethylenic alkyl glucosides of this invention.

The polymerizable compositions of this invention find use as a starting material wherever a crosslinked polymeric composition is desired. Particular examples include articles formed by the shaping, e.g. casting, molding, or extrusion, of polymeric materials, as well as coatings, binders (e.g. for pigments of printing inks, magnetic media, etc.) and adhesives. The particular procedures used and the choice of the other necessary or desirable starting materials, catalysts, and other functional additives, as well as the amount of multi-ethylenic glycoside compound, will be within the skill of the art within which the crosslinked polymeric composition is employed.

For example, the polymerizable compositions of the present invention comprising the multi-ethylenic glycoside can be applied to substrates such as wood, metal, paper or plastics by any convenient method such as knife blade, brush, or spray. The coated surface is then exposed to sufficient radiation, which may be either particulate or non-particulate radiation, to cure the reactive diluent through the radiation sensitive pi bonds. Suitable sources of particulate and non-particulate ionizing radiation include ultraviolet light, electron beam or radioactive sources such as are described in U.S. Pat. No. 3,935,330 issued Jan. 27, 1976 to Smith et al. To enhance the rate of radiation curing of the reactive diluent free radical initiators may be included in the composition such as benzoin, benzoin ethers, Michler's Ketone and chlorinated polyaromatic hydrocarbons. Other free radical initiators are ordinarily organic peroxides, hydroperoxides, peroxy acids, peroxy esters, azo compounds, ditertiary butyl peroxide, benzoyl peroxide, 2,4-dichlorobenzoyl peroxide, tertiary butyl hydroperoxide, 1,5-dimethyl-2,5-bis (hydroperoxy)-hexane, peroxyacetic acid, peroxybenzoic acid, tertiary butyl peroxypivalate, tertiary butyl peroxyacetic acid and azobisisobutyronitrile. The free radical initiator is typically present at from about 0.01 to about 20% by weight of the radiation curable components.

To ensure that the composition does not prematurely polymerize, a free radical inhibitor may be added to the polymerizable composition. Examples of suitable inhibitors include hydroquinone and the methyl ether thereof or butylated hydroxy toluene at a level of from about 5 ppm to about 2000 ppm by weight of the polymerizable components.

The amount of radiation necessary to cure the composition will of course depend on the angle of exposure to the radiation, the thickness of the coating to be applied, and the amount of polymerizable groups in the coating composition, as well as the presence or absence of a free radical initiating catalyst. For any given composition, experimentation to determine the amount of radiation sensitive pi bonds not cured following exposure to the radiation source is the best method of determining the amount and duration of the radiation required.

The following examples illustrate the invention and should not be construed to limit the invention. All parts, percentages and ratios are by weight unless noted otherwise.

EXAMPLES

In the following examples, the following general synthetic procedures were used. In the tables, the examples denoted by upper case letters are comparative examples and those denoted by arabic numerals are examples of this invention.

GENERAL PROCEDURES

A. General Procedure for the Synthesis of Alkyl Glucoside Unsaturated Esters For tri- and tetraesters, 5 g of methyl glucoside (hereinafter MeG) is dissolved in 100 ml of methylene chloride, with stirring, at room temperature, 0.05 g of hydroquinone (polymerization inhibitor) is added, equivalent amounts of triethylamine and the appropriate anhydride are added for the desired DS level, followed by the addition of 0.2 equivalents (based on MeG) of dimethylaminopyridine (hereinafter DMAP). The solution is stirred overnight (approximately 16 hrs.), 100 ml methylene chloride is added, and the solution is washed successively with 50 ml portions of 3M HCl until acidic, 3.0M NaOH until basic and saturated ammonium chloride and brine until about neutral pH. The organic solution is dried over magnesium sulfate, filtered, another 0.05 g of hydroquinone is added, and the solution is evaporated to dryness under reduced pressure and at temperatures less than 50 degree C. to give the crude product. In most cases, the product can be used as is, but if unreacted anhydride is present, additional NaOH washes will purify the product at the expense of some product loss. The procedure is essentially the same for dimethacrylates except that 500 ml of 4:1 methylene chloride/pyridine is the solvent, and no triethylamine or DMAP is necessary. Additional acidic washes are required to remove the pyridine for this latter modification.

B. General Procedure for the Synthesis of 4,6-0-Protected Alkyl Glucoside Unsaturated Esters The same procedure as for the tri- and tetraesters above is used except that for benzylidene MeG diesters, DMAP is required, but for benzylidene MeG monoesters, DMAP is omitted. For isopropylidene MeG monomethacrylates, no DMAP is needed, and more dilute conditions (300 ml of methylene chloride) are needed. The isopropylidene MeG esters are very easily hydrolyzed by base, so basic washes should be minimized.

C. Procedure for Methyl Methacrylate Co-polymerizations

Methyl methacrylate (used as is, inhibitor not removed) was mixed with the indicated percentage of multi-ethylenic crosslinker and 0.4 wt. % of benzoyl peroxide (catalyst) and poured into a mold consisting of two 4×6 inch glass plates coated by a hexane solution of lecithin (mold release) and spaced ⅛ inch apart by a U-shaped piece of polytetrafluoroethylene (Teflon ™, duPont) and held together by spring-loaded clamps. Both sides of the piece in contact with the glass were covered by polytetrafluoroethylene tape to reduce leakage. After filling the mold as completely as possible, another piece of polytetrafluoroethylene was clamped across the top of the U, and the mold was placed upright in an oven at 65 degree C. for 20 hrs., followed by one hour at 100 degree C. Because of the fumes produced, the oven should be inside a fume hood. The polymer was carefully removed from the mold while still hot to avoid cracking the cast molding, which was then cooled by laying it on a flat surface.

The above general procedures were used to prepare the compounds described in Table I and the castings described in Table II, below in which the casting's properties of glass transition temperature (Tg in °C.), Izod impact value and Gardner Color are shown.

TABLE I

Synthesis of Polymerizable Multi-ethylenic MeG Derivatives

| EXAMPLE | PRODUCT | EQ. REAGENT/ CARBOHYDRATE | CATALYST | D.S. (a) | % YIELD |
|---|---|---|---|---|---|
| A | Benzylidene methacrylyl MeG | 1.0 | — | 1.3 | 94.0 |
| 1 | Benzylidene dimethacrylyl MeG | 2.0 | DMAP | 2.0 | 99.0 |
| B | Benzylidene | 1.0 | — | 1.0 | 95.1 |

TABLE I-continued
Synthesis of Polymerizable Multi-ethylenic MeG Derivatives

| EXAMPLE | PRODUCT | EQ. REAGENT/ CARBOHYDRATE | CATALYST | D.S. (a) | % YIELD |
|---|---|---|---|---|---|
| | acrylyl MeG | | | | |
| 2 | Benzylidene diacrylyl MeG | 2.0 | DMAP | 2.0 | 94.0 |
| 3 | Tetramethacrylyl MeG | 4.0 | DMAP | 4.0 | 99.0 |
| C | Dimethacrylyl MeG | 2.0 | — | 2.3 | 86.8 |
| D | Triacrylyl MeG | 3.0 | — | 3.0 | 88.6 |
| 4 | Tetraacrylyl MeG | 4.0 | DMAP | 3.9 | 87.0 |
| E | Tetraallyl MeG | 4.0 | — | 4 0 | 72.8 |
| 5 | Trimethylacrylyl MeG | 3.0 | DMAP | 2.8 | 83.0 |
| F | Isopropylidene methacrylyl MeG | 2.0 | — | 1.4 | 99.0 (b) |
| G | Isopropylidene dimethacrylyl MeG | 1.0 | — | 1.7 | 99.0 (c) |

(a) Average degree of unsaturated substitution as determined by proton NMR integrations: Acrylates-vinyl (5.6–6.5 ppm)/MeG methoxy (3.4 ppm) Methacrylates-alpha-methyl (2.0 ppm)/MeG methoxy
(b) Yield based on expected dimethacrylate
(c) Yield based on expected monomethacrylate

TABLE II
Composition and Properties of Methyl Methacrylate Co-polymerizates of Multi-ethylenic MeG Derivatives and Comparative Multi-ethyleneic Monomers

| EXAMPLE | CROSSLINKER | POLYM. GROUPS/ MOLECULE | WT. % | Tg (°C.) | IZOD(b) IMPACT | GARDNER COLOR |
|---|---|---|---|---|---|---|
| H | None (Control) | — | — | 100 | C3 = 0.37 | 1 |
| | Conventional Crosslinkers | | | | | |
| I | Pentaerythritol triacrylate | 3.3 | 5.0 | 125 | C3 = 0.27 | 1 |
| J | Pentaerythritol tetramethacrylate | 4.0 | 5.0 | 117 | C2 = 0.28 | 1 |
| K | Pentaerythritol tetraacrylate | 4.0 | 5.0 | 111 | C3 = 0 19 | 1 |
| L | Trimethylolpropane trimethacrylate | 2.7 | 5.0 | 102 | C3 = 0.15 | 1 |
| M | Trimethylolpropane triacrylate | 2.7 | 5.0 | 118 | C1 = 0.19 | 1 |
| N | Glycerypropoxy triacrylalate | 2.7 | 5.0 | 115 | C2 = 0.20 | 1 |
| | MeG Unsaturated Esters | | | | | |
| 6 | MeG dimethacrylate | 2.3 | 5.0 | 111 | C3 = 0.21 | 6 |
| 7c | MeG trimethacrylate | 3.0 | 5.0 | 81 | C2 = 0.20 | 4 |
| 8 | MeG tetra-methacrylate | 4.0 | 5.0 | 116 | C3 = 0.26 | 4 |
| 9 | MeG triacrylate | 3.0 | 5.0 | 112 | C1 = 0.21 | 1 |
| 10 | MeG tetracrylate | 3.9 | 5.0 | 107 | C1 = 0.19 | 3 |
| | Benzylidene MeG Unsaturated Esters | | | | | |
| 11 | Benzylidene MeG methacrylate | 1.3 | 1.0 | 103 | C3 = 0.24 | 1 |
| 12 | Benzylidene MeG dimethacrylate | 2.0 | 1.0 | 108 | C2 = 0.26 | 1 |
| 13 | Benzylidene MeG acrylate | 1.0 | 1.0 | 108 | C3 = 0.28 | 1 |
| 14 | Benzylidene MeG diacrylate | 2.0 | 1.0 | 114 | C3 = 0.29 | 1 |
| | Isopropylidene MeG Unsaturated Esters | | | | | |
| 15 | Isopropylidene MeG methacrylate | 1.4 | 5.0 | 105 | C1 = 0.21 | 1 |
| 16 | Isopropylidene MeG dimethacrylate | 1.7 | 5.0 | 104 | C2 = 0 20 | 6 |
| | MeG Ethers | | | | | |
| 17 | MeG tetraallyl ether | 4.0 | 5.0 | 104 | C3 = 0.19 | 1 |

(a) - Conditions = 16 hrs. @ 65 degree C. 0.4 wt. % benzoyl peroxide, one hour post-cure @ 100 degree C.
(b) - Letter stands for type of break: C(n) = clean break, n samples
(c) - Sample did not fully polymerize under above conditions, even when post-cured for four hours @ 100 degree C., Tg is still considerably less than other samples, which indicates the sample may have been contaminated.

DISCUSSION

MeG Unsaturated Esters Synthesized in High Yields

Tri- and tetra-O-acrylyl MeG and di-, tri- and tetra-O-methacrylyl MeG were all synthesized in nearly quantitative yields (exact yields are listed in Table I) by reacting MeG with the desired equivalent amount of acrylic or methacrylic anhydride using pure methylene chloride or pyridine/methylene chloride as the solvent (see general procedures). Equivalent amounts of anhydride were used instead of excess, even for the tetraesters, because additional anhydride did not improve yields (or led to higher than desired substitution levels), and unreacted anhydride was extremely difficult to remove without substantial product hydrolysis. Pyridine was needed only for the synthesis of MeG dimethacrylate. Diacrylyl MeG could not be synthesized by this method as triesters were formed instead, possibly because of the higher reactivity of acrylic anhydride versus methacrylic anhydride. Dimethylaminopyridine (DMAP), an acylation catalyst, and triethylamine (TEA), a general base, were used for the synthesis of trimethacrylyl, tetraacrylyl and tetramethacrylyl MeG. The use of only one equivalent of anhydride produced a minimum of disubstitution, so MeG monoesters could not be synthesized by this procedure. DMAP was not required for the synthesis of MeG diesters.

4,6-O-Benzylidene MeG Unsaturated Esters Synthesized with High Selectivity

Nearly quantitative yields of mono- and di-O-acrylyl-4, 6-0-benzylidene MeG and mono-and di-O-methacrylyl-4,6-O-benzylidene MeG were obtained from the reaction of 4,6-O-benzylidene MeG with the desired equivalent amount of the appropriate anhydride in methylene chloride. The starting material, benzylidene MeG, was synthesized by the procedure described by D. M. Hall, Carbohydrate Research, 86,158 (1980).

The use of DMAP was critical in producing diesters of benzylidene MeG. Initially, the procedure of Haworth et al. was followed to synthesize dimethacrylyl benzylidene MeG. However, regardless of the amount of methacrylic anhydride used, a monomethacrylate was consistently produced, according to NMR and IR data. The melting point and optical rotation data obtained for the monomethacrylate were almost identical to the literature data for the dimethacrylate (Table III). But when DMAP was used in the reaction, a dimethacrylate was produced, according to NMR and IR data. Its melting point and optical rotation were markedly different from the data reported by Haworth et al. for a dimethacrylate. This data, and the fact that the elemental analysis given in the literature is between that expected for a mono- or dimethacrylate, indicates that the data reported by Haworth et al. is incorrect.

TABLE III

| Methacrylated Benzylidene MeG Derivatives | | | |
|---|---|---|---|
| | Lit. (a)(4) | Monomethacrylate | Dimethacrylate |
| M.P. (°C.) | 181 | 179–180 | 108–110 |
| [a] (°, c. 509/chloroform) | 90.4 | 89.4 | 75.8 | a-Literature values for supposed dimethacrylate

The synthesis of the acrylyl benzylidene derivatives paralleled the methacrylates both in yield and in that DMAP was also required for the synthesis of a benzylidene diacrylate; only benzylidene monoacrylates were produced in the absence of DMAP, regardless of the amount of acrylic anhydride used.

Structural analysis again relied on proton and carbon-13 NMR and IR. Of particular interest was the position of substitution in the monoacyl derivatives. Methacrylyl benzylidene MeG was greater than 95% 2-0-substituted, according to carbon-13 analysis, but acrylyl benzaliene MeG was determined to be 61% 3-0-substituted and 39% 2-0-substituted by carbon-13. The data for the monoacrylates is rather unexpected as the 2-hydroxyl is generally accepted to be more reactive than the 3-hydroxyl. See M. L. Wolfrom, W. A. Szarek, "Esters" from *The Carbohydrates*, p. 217–219 (2d ed. Academic Press, N.Y., N.Y. (1972).

4,6-O-Isopropylidene MeG Methacrylates Successfully Synthesized

Methacrylyl-4,6-O-isopropylidene MeG and dimethacrylyl-4,6-O-isopropylidene MeG were synthesized in quantitative yields using the previously described procedure. Again, the starting protected MeG was synthesized by a known method (Wolfrom et al., Carbohydrate Research, 35, 87 (1974)). However, the synthesis of the isopropylidene derivates did not show the same selectivity observed during the synthesis of the benzylidene derivatives. 2,3-Di-0-4,6-0-isopropylidene MeG could be synthesized without using DMAP and, if high concentrations were used, using only one equivalent of methacrylic anhydride, apparently leading 50% of the starting material unreacted. When the dimethacrylate was synthesized from two equivalents of methacrylic anhydride, the product was contaminated by some unreacted anhydride, according to NMR and IRA data, indicating again that some isopropylidene MeG did not react. Attempts to remove the unreacted anhydride by basic washes resulted in partial hydrolysis of the dimethacrylate to monomethacrylate. Consequently, the purified dimethacrylate actually had an average of only 1.7 methacrylyl groups/isopropylidene MeG, according to proton NMR. The monomethacrylate could only be synthesized under very dilute conditions and had an average of 1.4 methacrylyl groups/isopropylidene MeG, so it included some dimethacrylate.

Both the starting material and the products are highly soluble in most organic solvents. In fact, isopropylidene MeG is soluble in virtually any solvent, including water.

The carbon-13 NMR spectra of these products were difficult to analyze as they were mixtures of dimethacylate and the two monomethacrylate isomers.

Tetra-O-Allyl, Di-O-allyl MeG synthesized in Varying Yields

Tetra-O-allyl MeG was synthesized in 72.8% yield and di-O-allyl MeG was synthesized in 31.1% yield. Both syntheses involved the reaction of MeG initially with sodium hydride to form a sodium salt of MeG, followed by alkylation with allyl bromide. The low yield for the di-O-allyl MeG was probably due to losses during aqueous washes because of the diallyl derivative's higher water solubility.

The structure of tetra-O-allyl MeG was confirmed by NMR and IR data.

Evaluation of Polymerizable MeG Derivatives and Comparison to Conventional Multi-ethylenic Crosslinkers All of the polymerizable MeG derivatives readily co-polymerized with methyl methacrylate (MM) to form hard, clear, glassy cast moldings. All were soluble in MM at a minimum level of 5 wt. %, except for the benzylidene MeG derivatives, which tended to gel in MM and other organic solvents. Therefore, the benzylidene MeG derivatives were co-polymerized with MM at the maximum soluble level of 1 wt. %.

The MeG derivative-containing co-polymerizates and six conventional co-polymerizates were analyzed for glass transition temperature (Tg), Izod impact, torsional modulus and Gardner color. The data is listed in Table 11, except for the torsional modulus curves, which are characterized below.

The Tg is an overall measure or summation of the properties of a polymer. Generally, a high Tg indicates high hardness, high stiffness and increased brittleness in a polymer. On addition of a cross-linking agent to a polymer, the Tg will usually increase as the aforementioned properties are affected by cross-linking linear polymer chains. However, Tg is high sensitive to very small changes in a polymer system, and it is very risky to assign a single number to represent such a large range of properties in such a complex mixture as a polymer.

Izod impact is a measure of the brittleness of a polymer, an undesirable property generally caused by high cross-linking. A low Izod number indicates a brittle polymer, i.e., a low amount of force was required to break a sample of the polymer. Izod is not as sensitive to small polymer formulation changes as Tg and is usually very reproducible.

Torsional modulus is a measure of the stiffness or lack of elasticity of a polymer over a range of temperatures. It is probably one of the best measures of polymer properties because it does not reduce a particular polymer property to a single number. Instead, the data for torsional modulus is usually presented as a graph of torsion modulus (G) versus temperature, with high G values at low temperatures and decreasing G values with increasing temperature. Tg can sometimes be determined from torsional modulus curves, although not as accurately as can be determined using a differential scanning calorimeter. Generally, torsional modulus curves are shifted upward (higher G values) and to the right (higher temperature) by the addition of cross-linking agents to a polymer system.

With these polymer properties in mind, the effects of polymerizable MeG derivatives on poly(methyl methacrylate) cast moldings were compared to the effects of conventional multi-ethylenic crosslinking monomers.

The polymerizable MeG derivatives as a group compare very favorably as polymer additivies versus the trimethylolpropane (TMP)- and glycerolpropoxy (GP)-based monomers as additives in terms of the co-polymerizates' Tg., Izod impact and torsional modulus. Most of the MeG derivatives caused slightly lower Tgs, but also generated Izod values equal to or greater than those generated using the TMP- and GP-based monomers (see Table II), and the torsional modulus curves for the MeG derivative-containing co-polymers are about the same as or shifted to the right of the curves from the TMP or GP co-polymers. Only tetraallyl MeG did not perform, overall, as well as these conventional crosslinking monomers.

The benzylidene MeG derivatives performed best in comparison to the TMP- and GP-based MFMs, with slightly lower Tgs, but substantially higher Izod values and about the same torsional modulus curves, despite being used at only 1 wt % because of solubility limitations (all other MeG derivatives and all of the conventional monomers were used at 5 wt % in methyl methacrylate). The benzylidene MeG derivatives also had lower functionality than the conventional monomers (see Table II). The remarkable performance of the benzylidene MeG derivatives may be attributable to the bicylic structure of the derivatives imparting greater rigidity to the polymer structure. Selected MeG esters, such as tetramethacrylyl MeG and triacrylyl MeG, also performed very well compared to the conventional monomers, but these derivatives were used at 5 wt % and had similar levels of functionality.

The performance of the other MeG esters and isopropylidene MeG derivatives was highly variable, which may indicate shortcomings in the data. It is difficult to confirm expected trends such as increasing Tg and torsional modulus with increasing DS or decreasing Izod values with increasing DS from the data in Table II. The reason for the variable performance may simply be the nature of the polymers or slight differences in the curing of the polymers. As stated earlier, Tgs were very sensitive to minute changes in the polymer system and consequently could only be reproduced approximately +/−4° C., but the Izod and torsional modulus data were highly reproducible, even for different moldings using the same additive.

The performance of most of the MeG derivatives when compared specifically to glycerylpropoxy triacrylate (GPTA) is especially promising. GPTA is regarded as an advantageous crosslinking monomer because of its low toxicity, as well as for its polymer-improving properties. Most of the MeG derivatives caused Tgs close to that caused by GPTA, Izod values equal to or greater than those caused by GPTA and the same or better torsional modulus curves than those caused by GPTA. Since the MeG derivatives may be even less toxic than GPTA (based on the comparative toxicities of MeG versus glycerol, with everything else being equal), these performance results are very favorable.

The pentaerythritol (PE)-based MFMs were the best performing additives tested. They generally caused the highest Tgs and Izod values and the best torsional modulus curves for their co-polymers. However, the MeG derivatives in many cases were not significantly different in their Izod values and torsional modulus curves, although slightly less in both.

What is claimed is:

1. A polymerizable composition of matter useful in forming a crosslinked polymeric composition comprising:
   (a) a major amount of a polymerizable component selected from the group consisting of mono-ethylenically unsaturated monomers, reactive oligomers, reactive polymers, and mixtures thereof; and
   (b) a minor amount of a multi-ethylenic alkyl glucoside compound having the structural formula:

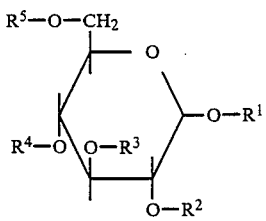

wherein $R^1$ is alkyl and $R^2$–$R^5$ are selected such that
   (i) $R^2$–$R^5$ are acrylyl groups, or
   (ii) $R^2$–$R^5$ are independently selected from hydrogen, alkyl, aralkyl, allyl, acrylyl, and methacrylyl, provided that at least three of $R^2$–$R^5$ are methylacrylyl groups, or (iii) $R^4$ and $R^5$ together comprise the residue of an aromatic aldehyde, and $R^2$ and $R^3$ are independently selected from the group consisting of acrylyl groups and methacrylyl groups.

2. A composition as claimed in claim 1, wherein $R^2$-$R^5$ are acrylyl groups.

3. A composition as claimed in claim 1, wherein $R^2$-$R^5$ are independently selected from hydrogen, alkyl, aralykyl, allyl, acrylyl, and methacrylyl, provided that at least three of $R^2$-$R^5$ are methyacrylyl groups.

4. A composition as claimed in claim 1, wherein $R^4$ and $R^5$ together from the residue of an aromatic aldehyde, and $R^2$ and $R^3$ are independently selected from the group consisting of acrylyl groups and methacrylyl groups.

5. A composition as claimed in claim 1 wherein $R^1$ is lower alkyl having from one to four carbon atoms.

6. A polymerizable composition of claim 1 wherein $R^1$ is lower alkyl having from one to four carbon atoms.

7. A polymerizable composition of claim 1 wherein said polymerizable component consists of a mono-ethylenically unsaturated monomer.

8. A polymerizable composition of claim 7 wherein said mono-ethylenically unsaturated monomer is selected from the group consisting of alkyl acrylates, alkyl methacrylates, vinyl esters, vinyl amines, and vinyl aromatic compounds.

9. A polymerizable composition of claim 8 wherein said monomer is methyl methacrylate.

10. A polymerizable composition of claim 1 wherein said polymerizable component comprises a reactive oligomer having a molecular weight of from about 1,000 to about 25,000 g/mol and ethylenic unsaturation.

11. A polymerizable composition of claim 1 wherein said polymerizable component comprises a reactive polymer which is a graft polymerizable polyolefin or a diene homopolymer or copolymer.

12. A polymerizable composition of claim 1 wherein said minor amount ranges from about 0.1% to about 10% by weight of the polymerizable components of the polymerizable composition.

13. A polymerizable composition of claim 1 wherein said minor amount is sufficient to increase the gel content of the polymerizable composition upon polymerization thereof by at least about 1%.

14. A crosslinked polymeric composition comprising the product made by curing the composition of claim 1.

15. A method of coating a substrate comprising applying to a substrate a layer of a polymerizable composition of claim 1 and curing said composition.

16. A method of binding a pigment comprising mixing a pigment with a composition of claim 1 and curing said mixture.

17. A method of preparing a crosslinked polymeric article-comprising shaping a polymerizable composition of claim 1 and curing said composition.

18. A method of claim 17 wherein the polymerizable component of said composition consists of a mono-ethylenically unsaturated monomer and the multi-ethylenic alkyl glucoside compound has the structural formula:

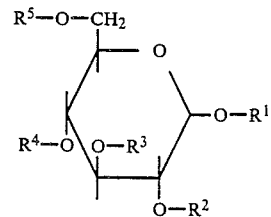

wherein $R^1$ is alkyl and $R^2$-$R^5$ are independently selected from hydrogen, alkyl, aralkyl, allyl, acrylyl, and methacrylyl, provided that:

(a) $R^2$-$R^5$ are acrylyl groups, or (b) $R^2$-$R^5$ are independently selected from hydrogen, alkyl, aralkyl, allyl, acrylyl, and methacrylyl, provided that at least three of $R^2$-$R^5$ are methyacrylyl groups, or (c) $R^4$ and $R^5$ together comprise the residue of an aromatic aldehyde, and $R^2$ and $R^3$ are independently selected from the group consisting of acrylyl groups and methacrylyl groups.

* * * * *